United States Patent [19]
Röhm

[11] Patent Number: 5,172,617
[45] Date of Patent: Dec. 22, 1992

[54] LATHE CHUCK

[76] Inventor: Günter H. Röhm, Heinrich-Röhm-Strasse 50, D-7927 Sontheim, Fed. Rep. of Germany

[21] Appl. No.: 641,154

[22] Filed: Jan. 14, 1991

[30] Foreign Application Priority Data

Jan. 12, 1990 [DE] Fed. Rep. of Germany ....... 4000714
Jan. 13, 1990 [EP] European Pat. Off. ........ 90100697.3

[51] Int. Cl.⁵ ............................................. B23B 31/26
[52] U.S. Cl. .................................... 82/142; 279/110; 279/134; 74/89.15
[58] Field of Search ............... 279/1 H, 117, 121, 110, 279/64, 60, 69, 114, 115, 116; 82/142; 409/233; 74/89.15

[56] References Cited

U.S. PATENT DOCUMENTS

| | | | |
|---|---|---|---|
| 237,731 | 2/1881 | Doyle | 279/104 |
| 1,786,147 | 12/1930 | Bullard | 279/121 |
| 2,575,662 | 11/1951 | Highberg | 279/114 |
| 2,786,689 | 3/1957 | Kalenian | 279/116 |
| 4,567,794 | 2/1986 | Bald | 82/1.11 |
| 4,573,380 | 3/1986 | Bald | 279/1 R X |
| 4,748,357 | 5/1988 | Kempken | 74/89.15 |
| 5,005,453 | 4/1991 | Rohm | 82/142 |

FOREIGN PATENT DOCUMENTS

| | | |
|---|---|---|
| 3218083 | 11/1983 | Fed. Rep. of Germany . |
| 2208319 | 6/1974 | France . |
| 383162 | 11/1932 | United Kingdom . |
| 2194615 | 3/1988 | United Kingdom . |

OTHER PUBLICATIONS

European Search Report 90100697.

*Primary Examiner*—Larry Schwartz
*Assistant Examiner*—Robert Schultz
*Attorney, Agent, or Firm*—Herbert Dubno; Andrew Wilford

[57] ABSTRACT

A power chuck has a stationary housing, a chuck spindle rotatable in the housing about a chuck axis, a plurality of jaws carried on the chuck body movable radially toward and away from one another, an actuator shaft movable axially relative to the body, a jaw actuator connected between the actuator shaft and the jaws for displacing same radially outward on displacement of the element in one axial direction and for displacing the jaws radially inward on opposite axial displacement of the shaft, and a motion converter carried on the spindle. The motion converter has a pair of coaxial input wheels centered on and rotatable about the axis on the spindle, gears connected between the input wheels for synchronously oppositely rotating same, an output element axially displaceable on the spindle and axially coupled to the shaft, and gearing interconnecting the input wheels and output element for axial displacement of the output element in one direction on rotation of one of the input wheels in one sense and for axial displacement of the output element in the opposite direction on rotation of the one input wheel in the opposite sense. Respective brakes between the housing and the input wheels can selectively rotationally retard rotation of the respective wheels relative to the housing.

19 Claims, 12 Drawing Sheets

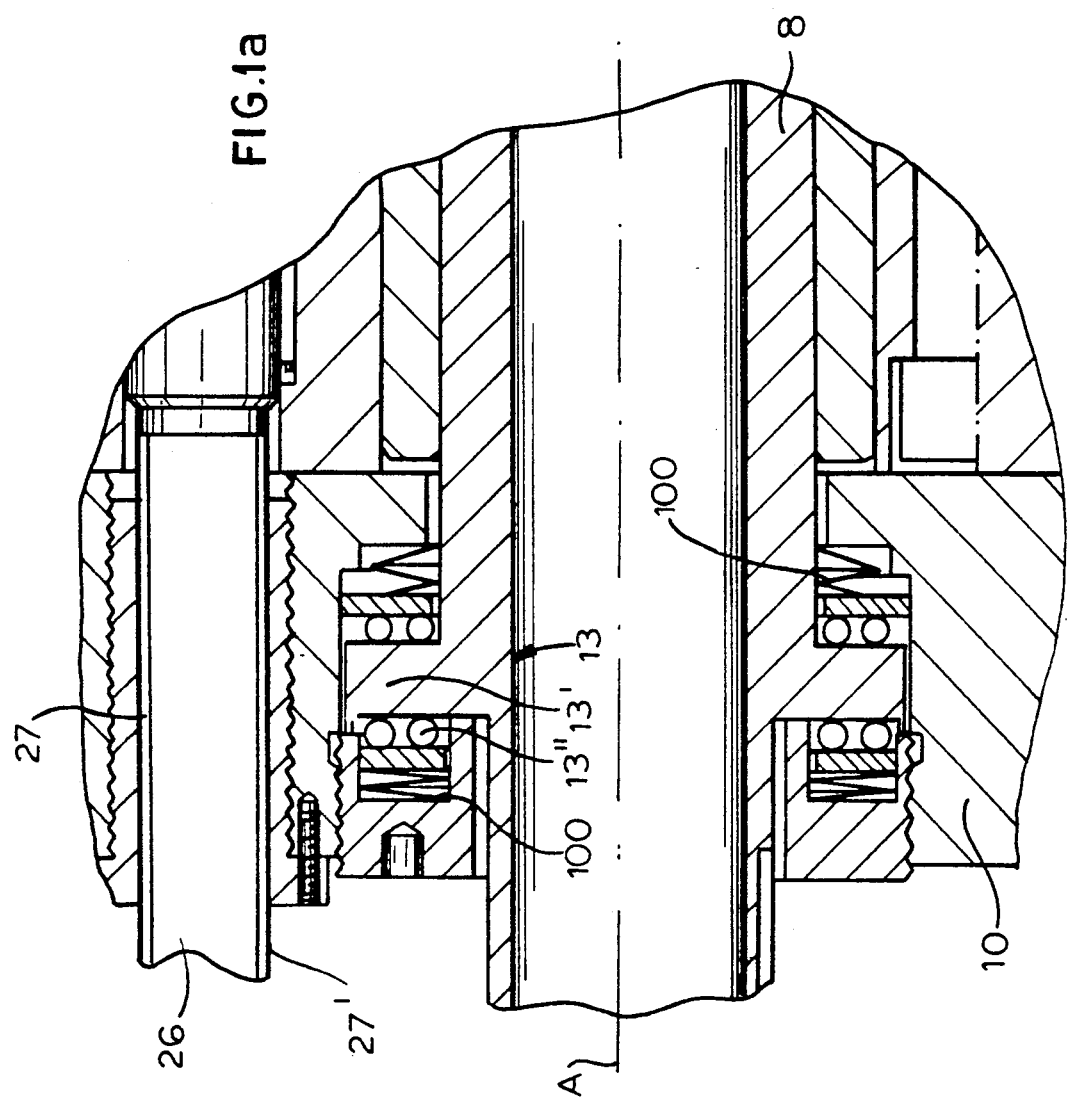

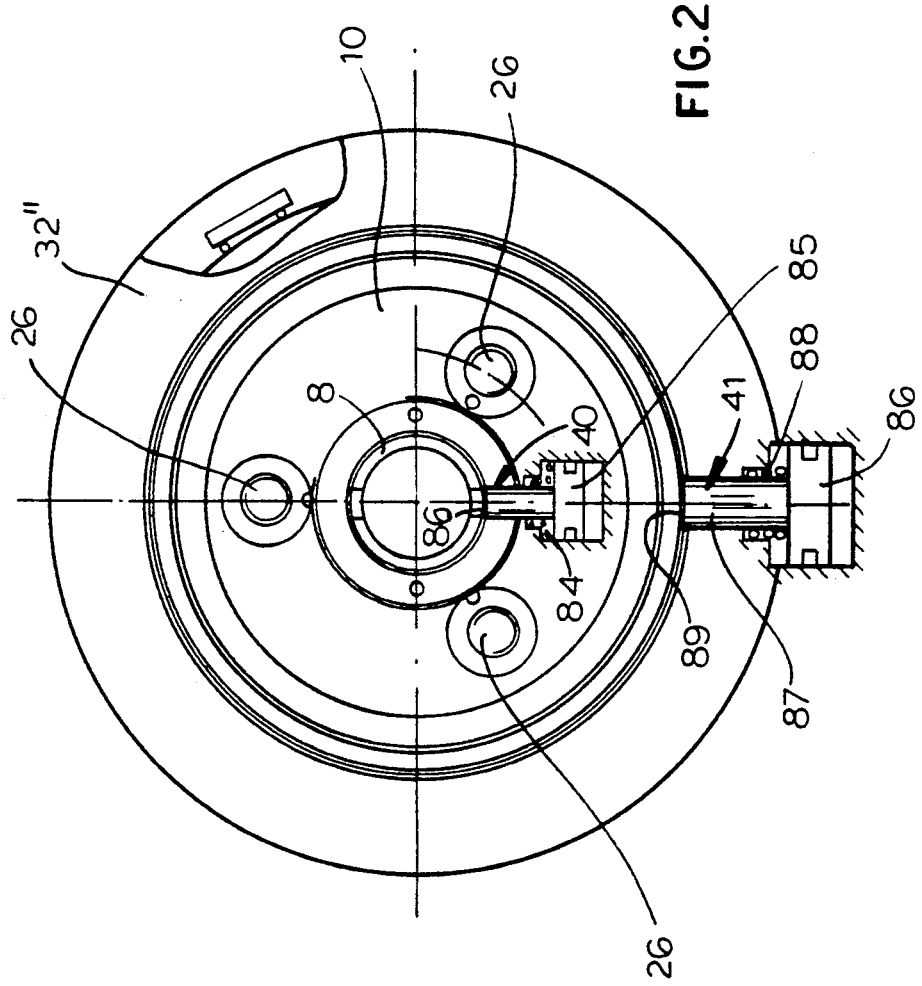

LATHE CHUCK

FIELD OF THE INVENTION

The present invention relates to a lathe chuck. More particularly this invention concerns such a chuck with a built-in actuator for opening and closing the chuck.

BACKGROUND OF THE INVENTION

A standard lathe chuck has a spindle that is rotated at high speed and that has a head carrying a plurality of jaws that can be moved radially. The spindle is typically hollow and houses an actuating rod that is axially displaceable in the spindle and that is connected in the head to mechanism that displaces the jaws radially together when the rod is moved axially in one direction and that displaces them axially apart when moved axially oppositely. These jaws can be used to externally or internally grip a workpiece held by the chuck.

It is known to provide on the end of the spindle remote from the chuck head a transmission having a pair of coaxial input wheels rotatable about the spindle axis, an output member axially coupled to the actuating rod, and gearing interconnecting the input wheels to the output member to convert net rotation in one direction of the input wheels into axial movement in one direction of the output member, and opposite rotation into opposite axial movement. The gearing can be at least one shaft extending parallel to the spindle and having one end formed with a pinion meshing with one of the rotary input wheels and an opposite end formed with a thread engaged axially in the output member, and another gear meshing between the input wheels to make them rotate synchronously opposite each other.

In my copending patent application 473,448 filed Feb. 1, 1990 (now U.S. Pat. No. 5,005,453 I describe an adjustment apparatus used in a machine tool having a housing normally rotated about a housing axis and having a part that is axially movable relative to the housing to adjust the tool. The apparatus has a drive having a rotary drive output, a differential transmission having a rotary input connected to the drive output and a pair of transmission outputs. This transmission includes a reverser for rotation of one of the transmission outputs opposite that of the other transmission output. Respective wheels coupled to the transmission outputs are rotatable coaxially on the tool housing and respective screws are rotationally coupled to the wheels, axially fixed on the tool housing, and both threaded in the movable part of the machine tool. One of the screws is of opposite hand to the other screw.

In accordance with further features of this earlier invention the differential transmission comprises a pair of coaxial output bevel gears one of which constitutes one of the transmission outputs, a rotary input wheel between the bevel gears, an equalizing gear carried on the input wheel and meshing with the bevel gears, and a reversing gear train connected between the other bevel gear and the other transmission output. The transmission outputs are respective output transmission gears one of which is fixed directly to the one output bevel gear and the other of which is connected via the reversing gear train to the other output bevel gear. In addition the transmission has a housing and both of the transmission output gears are coaxial and carried on the same side of the housing. The transmission includes an input shaft carrying the input wheel and connected to the drive output and the one transmission output gear is coaxially carried on the input shaft and the other transmission output gear is coaxially carried on the one transmission output gear. Finally the two transmission output gears are of the same diameter as each other, the two bevel gears are of the same diameter as each other, and the wheels are of the same diameter as each other so that the transmission outputs will move identically but oppositely.

While such an arrangement is relatively effective, it has the considerable disadvantage that a multiplicity of parts are in constant relative rotation, whether they are doing any real work or not. In other words even when the chuck is set and not needing of any adjustment, the various wheels and gears are all counterrotating. Even though there is no net rotation, that is the rotation in one direction is exactly equal to that in the opposite direction, the parts are still moving and subject to considerable wear.

OBJECTS OF THE INVENTION

It is therefore an object of the present invention to provide an improved lathe chuck.

Another object is the provision of such an improved lathe chuck which overcomes the above-given disadvantages, that is which can be adjusted while rotating, but which is relatively quiescent except when being adjusted.

SUMMARY OF THE INVENTION

A power chuck according to this invention has a stationary housing, a chuck spindle rotatable in the housing about a chuck axis, a plurality of jaws carried on the chuck body movable radially toward and away from one another, an actuator shaft movable axially relative to the body, a jaw actuator connected between the actuator shaft and the jaws for displacing same radially outward on displacement of the element in one axial direction and for displacing the jaws radially inward on opposite axial displacement of the shaft, and a motion converter carried on the spindle. The motion converter has a pair of coaxial input wheels centered on and rotatable about the axis on the spindle, gear unit connected between the input wheels for synchronously oppositely rotating same, an output element axially displaceable on the spindle and axially coupled to the shaft, and gearing interconnecting the input wheels and output element for axial displacement of the output element in one direction on rotation of one of the input wheels in one sense and for axial displacement of the output element in the opposite direction on rotation of the one input wheel in the opposite sense. Respective brake between the housing and the input wheels can selectively rotationally retard rotation of the respective wheels relative to the housing.

Thus with this arrangement it is possible to adjust the chuck while it is rotating, but no parts move relative to each other when no adjustment is taking place. This makes the chuck run much more quietly and with much less wear than is possible in the prior-art systems. All of the complex connections and such required in the prior-art systems are eliminated. In addition it is possible to apply a predetermined rotation-retarding force to one or the other input wheel to set a desired clamping force at the chuck jaws.

In accordance with the invention a bearing interconnects the output element and the shaft for joint axial movement but relative radial rotation. Furthermore the two input wheels have confronting toothed faces and the gear unit includes a gear rotatable about an axis perpendicular to the chuck axis. The spindle is provided with a radially projecting pivot centered on the axis of the gear and rotationally supporting the gear.

The gearing according to this invention includes respective axially extending rods having ends threaded into the output member and ends carrying gears meshing with the respective input wheels. The gear unit includes respective sets of teeth on the rods meshing with each other. The gearing also includes at least one axially extending rod having an end threaded into the output member and an opposite end formed with a gear. One of the input wheels is formed with a ring of teeth meshing with the gear of the rod. The rod is journaled in the other input wheel and has another gear and the spindle is formed with a ring of teeth meshing with the other gear. It is also within the scope of the invention to use a hydraulic or pneumatic motion converter.

The motion converter according to the invention includes a ring rotatable about the chuck axis in the spindle. The rod is journaled in the ring and has another gear and the other input wheel is formed with another ring of teeth meshing with the other gear of the rod. One of the rings of teeth is external and the other ring of teeth being internal. The screwthreads of the rods are opposite. Furthermore the output member is provided with a bushing in which the rod is axially threaded and with a pair of stops permitting the bushing to rotate through less than one revolution in the output member on rotation of the rod. Thus the rod can get up to speed before the bushing is stopped to break loose any frozen screwthreads.

The brake unit includes respective coils juxtaposed with the input wheels and unit for measuring the field strengths of the coils to determine the braking force. Each coil is provided with a stator ring coaxially surrounding the respective wheel and each wheel has a ferromagnetic rim juxtaposed with the respective coil. A controller is connected to the coils for alternately energizing same to form with them fields of variable strength. It is also of course within the scope of this invention to use a simple disk-type clutch or brake.

In accordance with further features of this invention a motor is provided on the housing adjacent one of the input wheels and having a rotary output and a clutch is connected between the motor output and one of the input wheels and is closable to rotationally interconnect same.

The system of this invention can also comprise a brake unit for rotationally relatively fixing the jaws, shaft, and jaw-actuator unit relative to the spindle and a controller connected to the brake unit for, in a machining position rotationally fixing the jaws, shaft, and jaw-actuator unit relative to the spindle while permitting the input wheel to rotate freely about the axis and, in an adjusting position, for fixing the input wheel against rotation relative to the housing and freeing the jaws, shaft, and jaw-actuator unit to rotate relative to the spindle. Thus in the adjusting position rotation of the spindle will adjust the position of the jaws and in the machining position arresting of the input wheel will also adjust the position of the jaws.

The spindle according to the invention has an outer end fixed to and carrying the jaw actuator and an inner end adapted to be connected to a drive. The brake unit includes a normally closed clutch between the inner and outer spindle ends and normally rotationally linking same together and an openable and closable link unit engageable between the housing and the outer spindle end and displaceable between a coupling position rotationally linking same, opening the clutch, and thereby rotationally arresting the outer spindle end and a decoupling position rotationally coupling the spindle ends.

The link unit itself includes a link body axially displaceable in the housing, the outer spindle end being formed with an axially open recess in which the link body is engageable and a cylinder formed in the housing around the body and pressurizable to displace the body away from the recess. The brake unit includes an openable and closable link unit engageable between the housing and the shaft and displaceable between a coupling position rotationally linking same and thereby rotationally arresting the shaft and a decoupling position permitting the shaft to rotate in the housing. The link unit can also include a link body axially displaceable in the housing. In this case the shaft is formed with an radially open recess in which the link body is engageable. A spring braced between the link body and the housing urges the body axially away from the recess and a cylinder formed in the housing around the body and pressurizable to displace the body away from the recess and compress the spring.

The brake can also include an openable and closable link unit engageable between the housing and the input wheel and displaceable between a coupling position rotationally linking same and thereby rotationally arresting the input wheel and a decoupling position permitting the input wheel to rotate in the housing.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 1a is a large-scale view of a detail of a variant on the structure of FIG. 1;

FIG. 2 is an end view taken in the direction of arrow II of FIG. 1;

SPECIFIC DESCRIPTION

Figure 1:
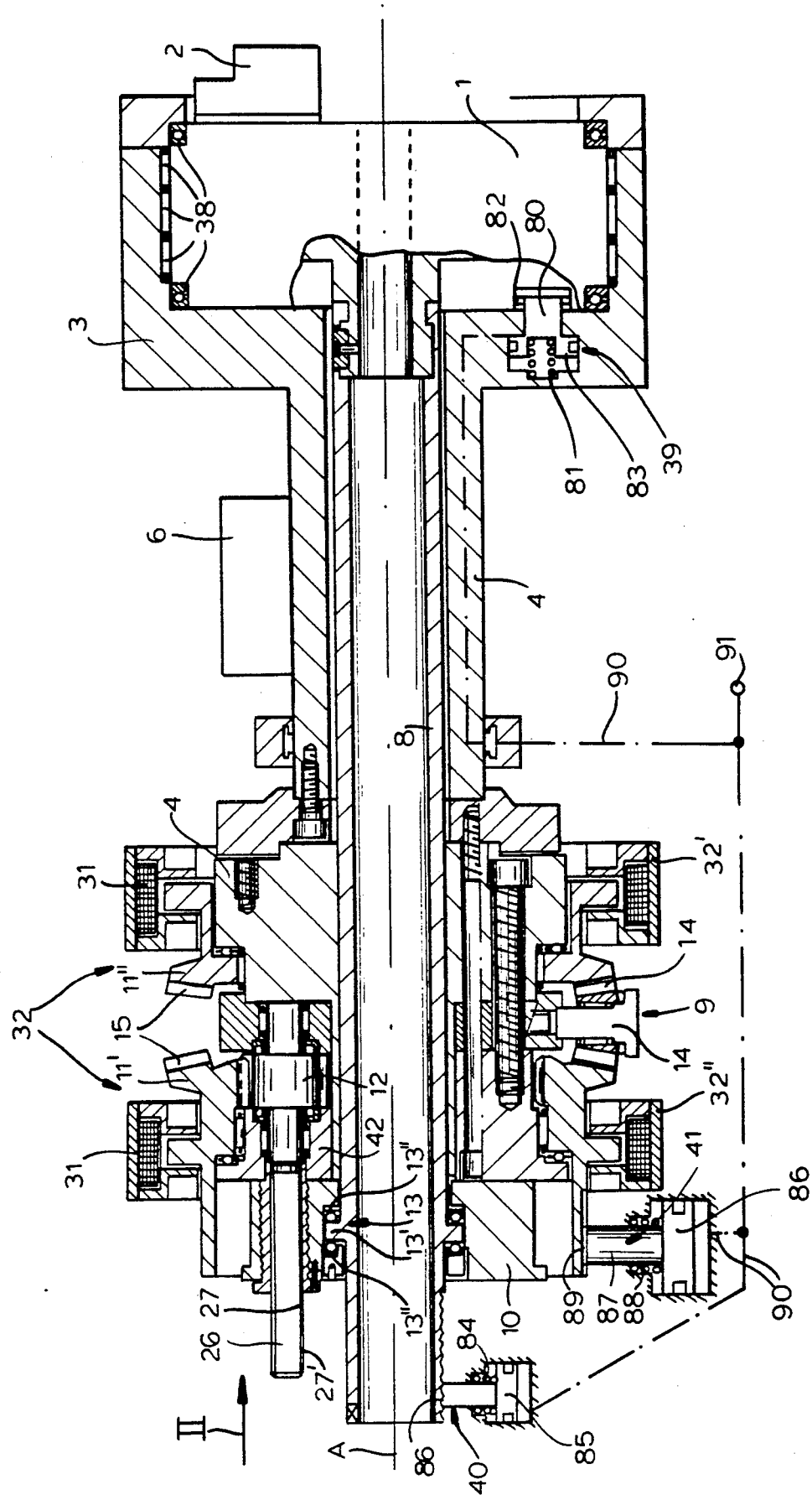
FIG. 1 is a partly diagrammatic axial section through the chuck assembly according to this invention.
Figure 3:
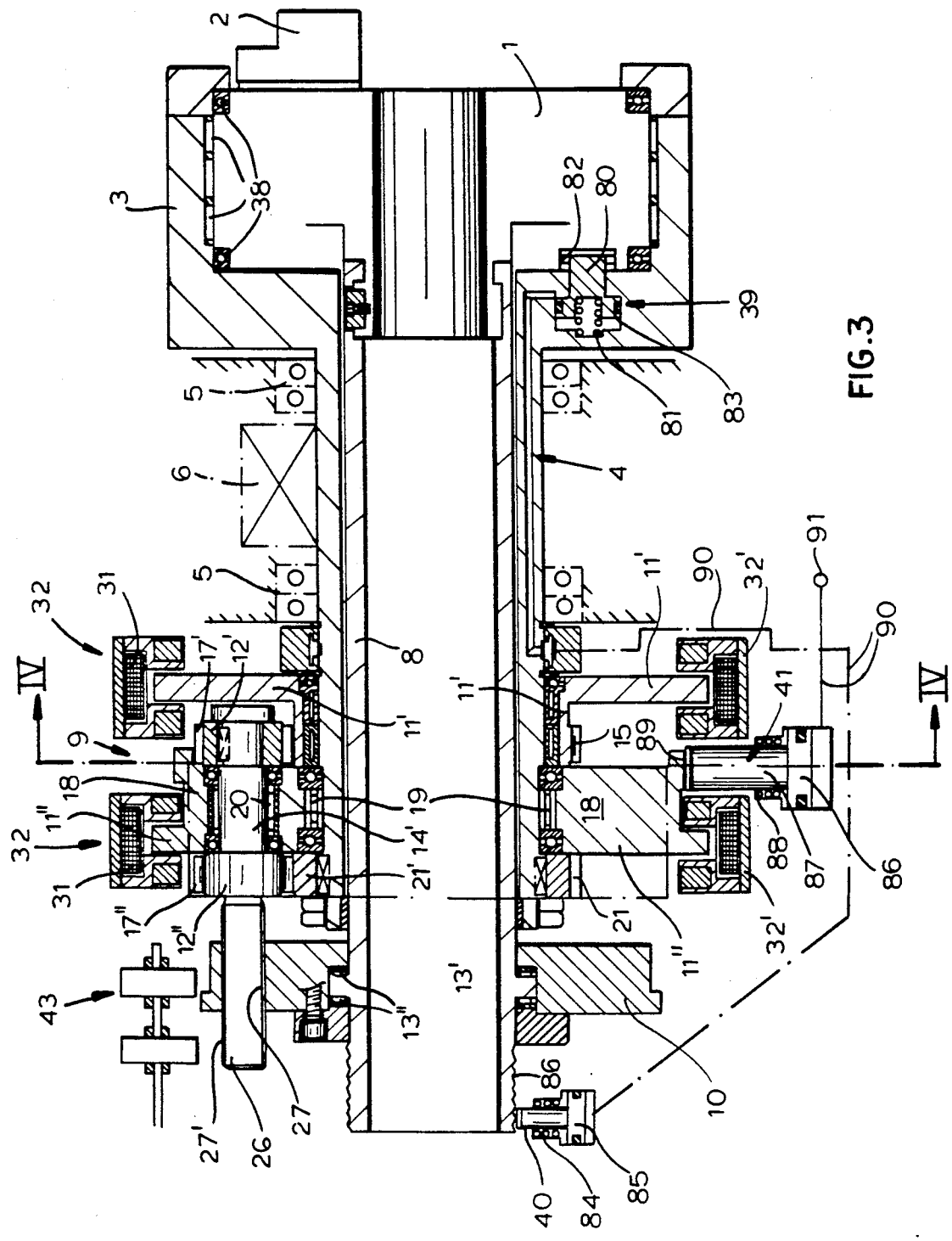
FIG. 3 is a view like FIG. 1 of another system according to the invention.

As seen in FIGS. 1 and 2 a chuck according to this invention has a spindle 4 centered on a normally horizontal axis A and having at one end a head 3 in which a plurality of angularly equispaced jaws 2 are radially displaceable. A standard converter 1 is connected to the jaws 2 (only one shown) and to an axially displaceable shaft 8 extending coaxially in the spindle 4. This converter 1 transforms axial displacement of the shaft 8 into synchronous radial displacement of the jaws 2, typically by unit of angled wedge formations formed on the shaft 8 fitting with complementary angled formations on the jaws 2. As illustrated in FIG. 3 bearings 5 support the spindle 4 on a stationary machine housing for rotation about the axis A. A motor illustrated schematically at 6 rotationally drives the spindle 4 either directly or via belts reeved in a pulley such as shown at 7 in FIG. 11.

The shaft 8 is displaced axially in the spindle 4 by a motion converter or transmission 9 having an output member 10 axially coupled to the shaft 8 and members 12. A coupling 13 is provided for transmitting axial force from the output member 10 to the shaft 8. This coupling 13 comprises as better shown in FIG. 1a a radially outwardly projecting ridge 13' formed on the shaft 8 and a pair of roller bearings 13" flanking the ridge 13' and braced axially oppositely against the member 10. In addition as seen in FIG. 1a springs in the form of stacks of belleville washers 100 can be provided between each bearing 13" and the member 10.

The transmission comprises a pair of facing bevel gears 11' and 11" forming input wheels that are independently rotatable about the axis A on the spindle 4 and that have facing sets of teeth 15 that mesh with at least one pinion 14 carried on a pin 6 projecting radially from the spindle 4. Thus rotation of one of the gears 11' or 11" in one direction will force identical but opposite rotation of the other gear. Each member 12 is a gear meshing with an annulus of teeth formed on an inside edge of the gear 11', and formed with a stem or rod 26 projecting axially and formed with an external screwthread 27' threaded into a hole of a bushing 27 fixed in the output member 10. Normally several such gears 12, three as indicated in FIG. 2, are provided that are angularly equispaced about the axis A.

Each of the gears 11' and 11" has a radially outwardly projecting ferrous rim received in a respective actuator 32' or 32" having a coil 31 and forming a braking unit 32. This unit 32 can electromagnetically brake rotation of either of the gears 11' or 11". Thus presuming the spindle 4 to be rotating about the axis A, it is possible to move the jaws 2 together or apart by applying a braking torque to one of the gears 11' or 11". Presuming the actuator 32' is used to apply a braking torque to the gear 11", this will cause the gears 14 to rotate and will in turn make the gear 11' rotate opposite to the gear 11". The gears 12 will be rotated to screw the rods 26 in the output member 10 and same and the shaft 8 will be displaced axially. On the other hand if the gear 11' is braked the orbiting gears 12 will rotate oppositely for axially opposite displacement of the shaft 8 and jaws 2.

FIGS. 1 and 2 also show how a latch unit 39 has a latch member 80 axially displaceable in the chuck head 3 and having an outer end engageable in a complementary recess 82 in the axial/radial converter 1 which is as illustrated mounted via bearings 38 in the head 3 for rotation therein about the axis A. A spring 81 urges the member 80 into the latched position coupling the unit 1 and jaws 2 with the head 3 and the chamber 39 in which the member 80 can move axially can be pressurized via a pneumatic line 90 from a source 91 to uncouple the converter 1 from the head 3.

Similarly another latch unit 40 has a member 85 engageable in a groove 86 formed in the shaft 8 and biased by a spring 84 into an unlatched position permitting the shaft 8 to rotate freely relative to the housing in which the piston 85 is slidable. Once again the pneumatic line 90 can be pressurized from a supply indicated schematically at 91, but here to latch the unit 40 and prevent rotation of the shaft 8.

Yet another latch 41 has a piston 86 seated in the housing 101 and provided with a shaft 87 engageable in a groove 89 formed in a collar extension formed on the one gear 11'. A spring 88 pushes the element 87 into the unlatched position and pressurization from the line 90 can lock the member 11' from rotating about the axis A.

Hence when the chuck is not rotating pressurization of the line 90 will rotationally decouple the motion converter 1 from the head 1 but will rotationally arrest the shaft 8, converter 1, and the gear 11'. Rotation of the spindle 4 will therefore effect the desired axial shifting of the shaft 8 by orbiting the gear 11" which is not held by its brake coil 31 and rotating the rods 26, thereby screwing these rods 26 in the output member 10 and shifting it and the shaft 8 axially relative to the spindle 4.

Figure 4:
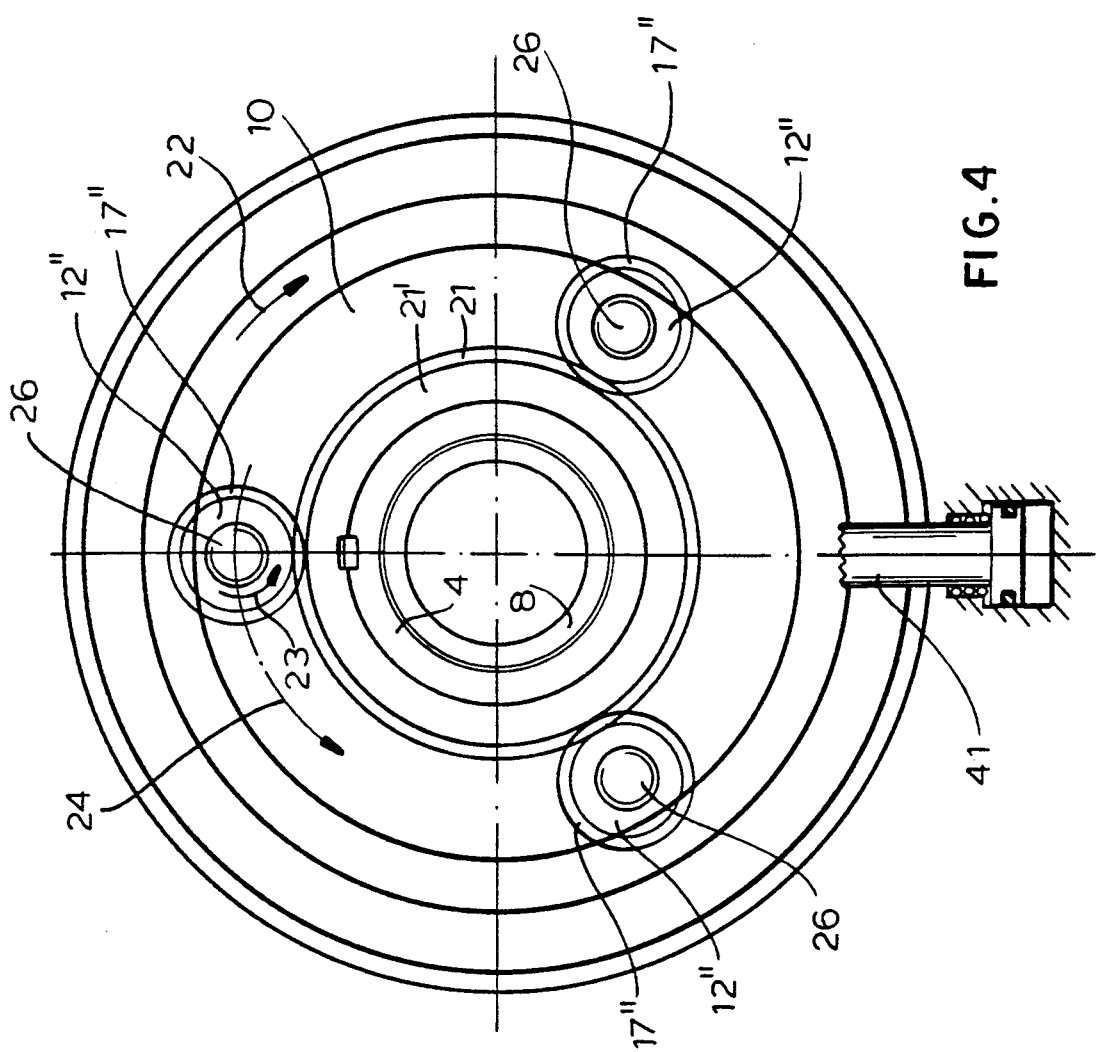
FIG. 4 is a section taken along line IV—IV of FIG. 3.

FIGS. 3 and 4 show an arrangement wherein there are three angularly equispaced output members 12" each carrying a pair of gears 17' and 17" that respectively mesh with gears 15 and 21' respectively formed on the member 11' and on the spindle 4. These gears 17' and 17" are carried on a shaft 14' supported by bearings 20 in a ring 18 rotatable on the spindle about the axis A and formed with the other member 11". In addition this arrangement is provided with position sensors 43 connected to a controller that operates the magnet assembly 32 for operating the chuck. The latch unit 41 is here connected to the ring 18. Otherwise this unit is identical to that of FIGS. 1 and 2.

With the system of FIGS. 3 and 4 when spindle 4 is rotating and the members 11' and 11" are free to rotate, these member 11' and 11" will turn opposite each other and the rods 26 will not rotate. On the other hand, arresting or retarding the member 11' by means of the braking unit 32, for instance, will cause the rods 26 to rotate in one direction, while arresting the member 11" connected to the ring 18 will oppositely rotate them. If the spindle 4 is fixed by pressurization of the line 90 and the motor 6 is actuated in conjunction with energization of one of the other of the coils 31 opens or closes the chuck.

Figure 5:
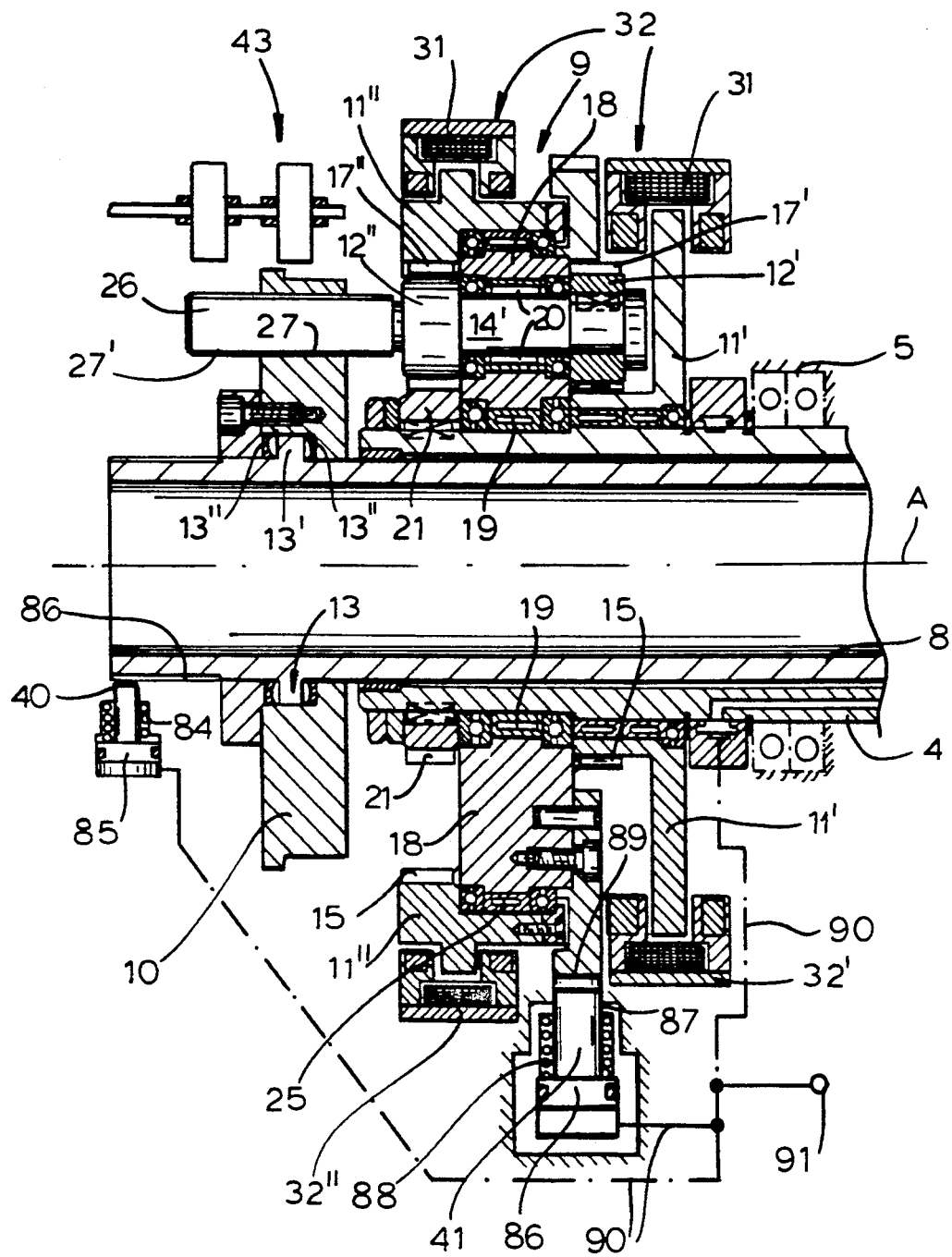
FIG. 5 is a sectional view of a detail of a variant on the structure of FIG. 3.
Figure 6:
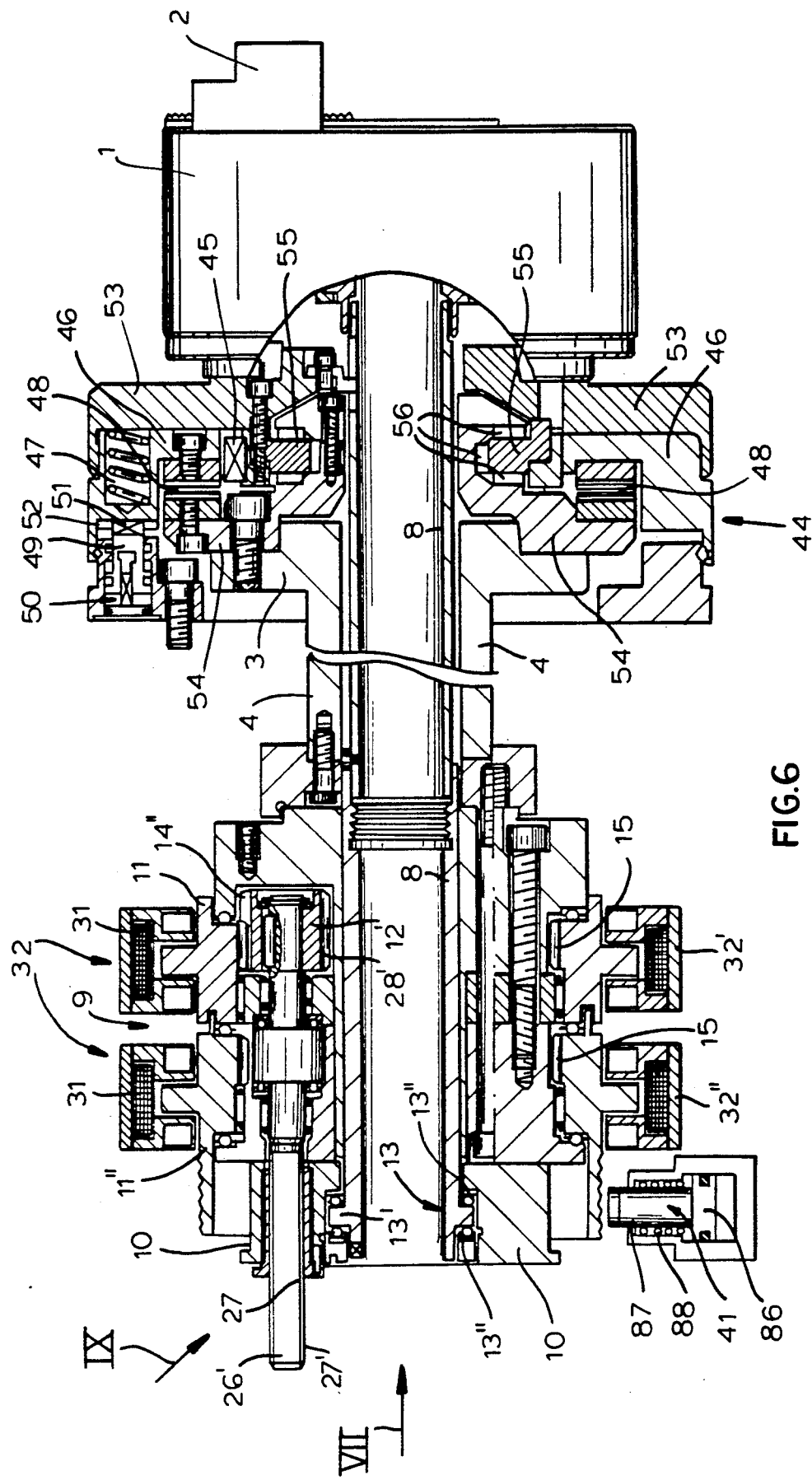
FIG. 6 is a view like FIG. 1 of yet another system in accordance with the invention.
Figure 7:
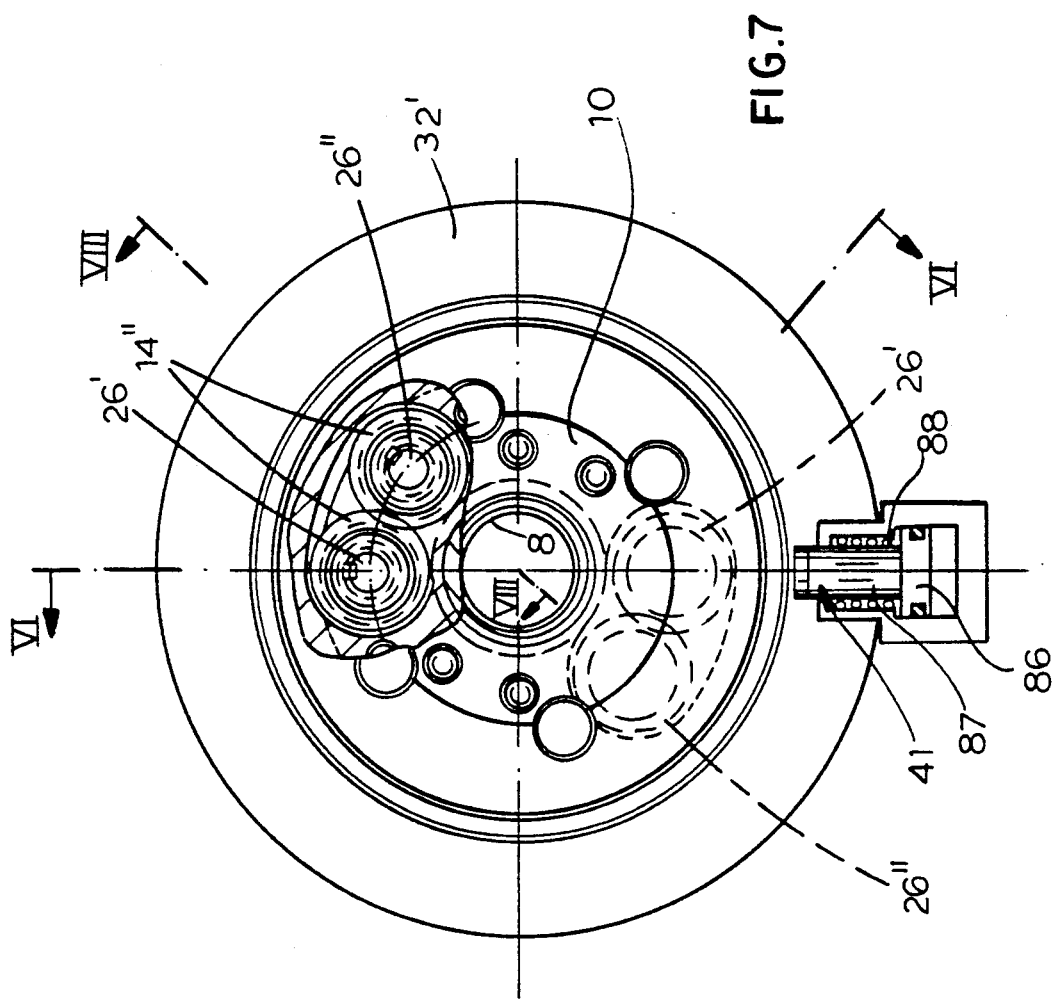
FIG. 7 is an end view taken in the direction of arrow VII of FIG. 6, line VI—VI of FIG. 7 being the section plane for FIG. 6.
Figure 8:
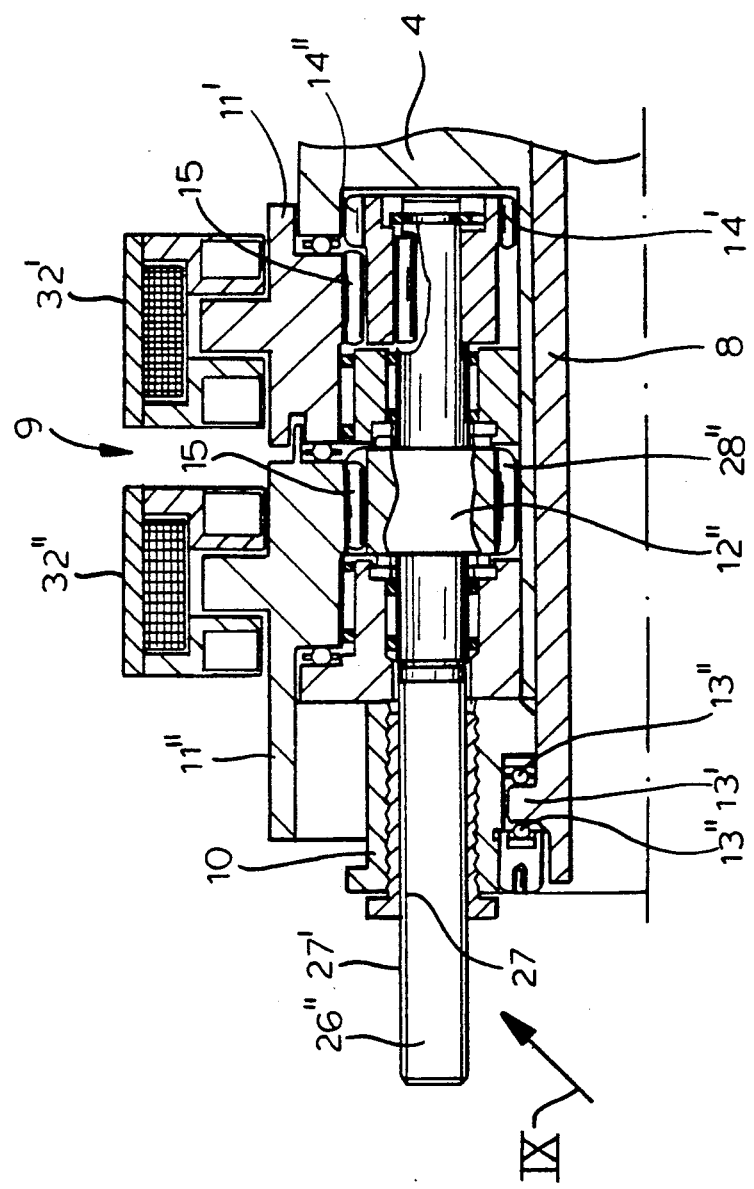
FIG. 8 is a section taken along line VIII—VIII of FIG. 7.

In FIG. 5 each member 12' has teeth 17' that mesh as in FIG. 3 with external teeth 15 of the respective input wheel 12', but each member 12" has teeth 17" that mesh with internal teeth of the member 11". The axles for the coaxial members 12' and 12" are supported in the bearings 20 in the ring 18 which here is supported by bearings 19 for rotation about the axis A. The latch unit 41 works on the ring 18.

Another system is shown in FIGS. 6 through 10. Here diametrically opposed pairs of actuator screws or rods 26' and 26" whose screwthreads 27' are of opposite hand are used. They have respective pinions 28' and 28" that serve as input wheels 12' and 12" and that mesh respectively with teeth 15 formed on the members 11' and 11". In addition each rod 26' is provided at its end with gearing 14" that meshes with identical gearing of the adjacent rod 26", so that each rod 26' will always rotate exactly opposite to the adjacent such rod 26", and vice versa.

Figure 10:
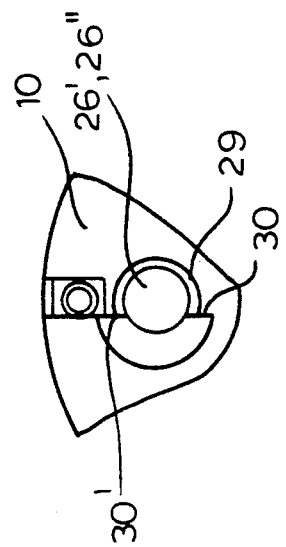
FIG. 10 is an end view taken in the direction of arrow X of FIG. 9.
Figure 9:
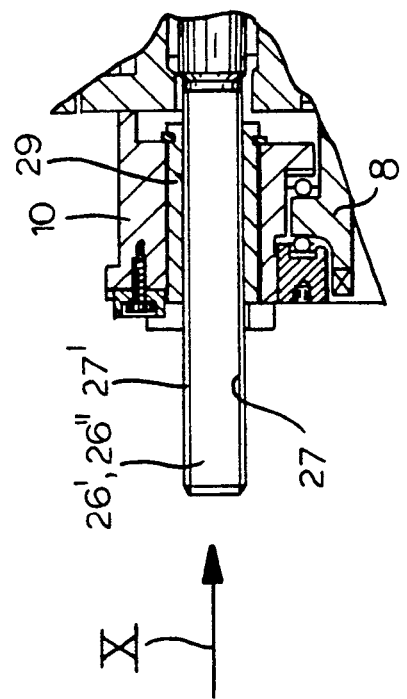
FIG. 9 is a detail view of the structure indicated at IX in FIGS. 6 and 8.

FIGS. 9 and 10 further show how in this arrangement each of the rods 26' and 26" is received in a bushing 29 that is axially fixed in the output member 10 but that is limitedly rotatable through somewhat less than 180° between stops 30 and 30' fixed on the output member 10. This allows the rods 26' and 26" and their bushings 29 to rotate somewhat and get up a little speed before they start axially moving the member 10, thereby making it easier to adjust a chuck that is somewhat frozen from having been left clamped for a while, ensuring that the threads 27' will not become stuck in the bore 27.

This arrangement also has a clutch 44 between the drive spindle 4 and the chuck actuator 1. This clutch 44 has a plate 46 rotationally coupled via keys 45 to a member 53 fixed to the actuator 1 and another plate 54 fixed on the spindle 4, with Hirth serrations 48 provided on confronting faces of the plates 46 and 54 and a spring 47 urging the plate 46 toward the plate 54. A pusher element 49 axially displaceable on the housing can be pressed by a hydraulic piston arrangement 50 against the plate 46 to push it out of engagement with the spindle 4 and body 3, that is against the force of the spring 47 to open the clutch 44. This element 49 has a locking part 51 engageable in radial grooves 52 of the plate 46 so that when it opens the clutch 44 it rotationally arrests the actuator 1.

The latch unit 41 here prevents the members 11' and 11" from rotating when the clutch 44 is open and the actuator 1 is arrested rotationally. In this position when the spindle 4 is driven as described above the transmission 9 can effect the desired opening or closing of the jaws 2.

Figure 11:
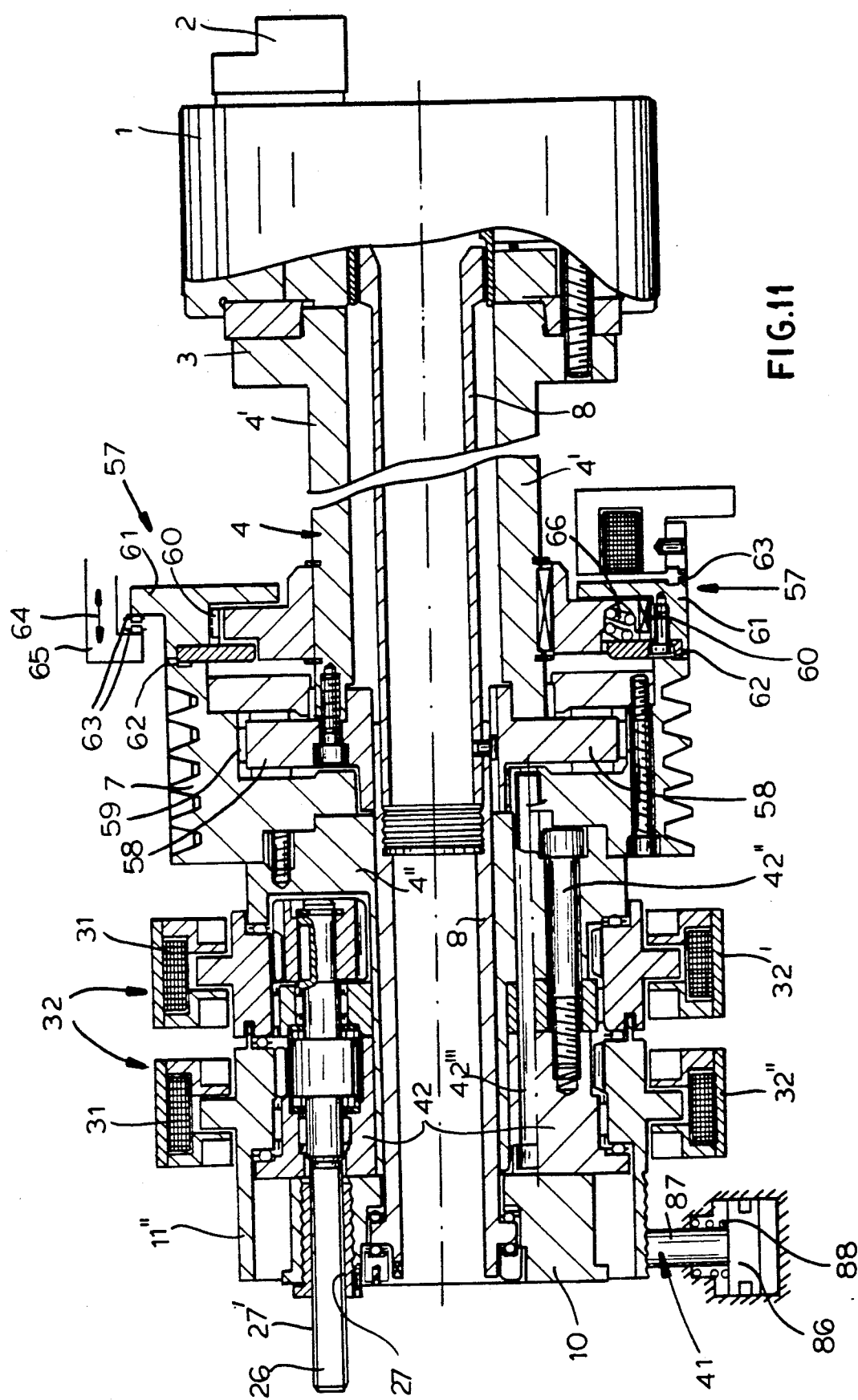
FIG. 11 is a view like FIG. 1 of a further system according to the invention.
Figure 12:
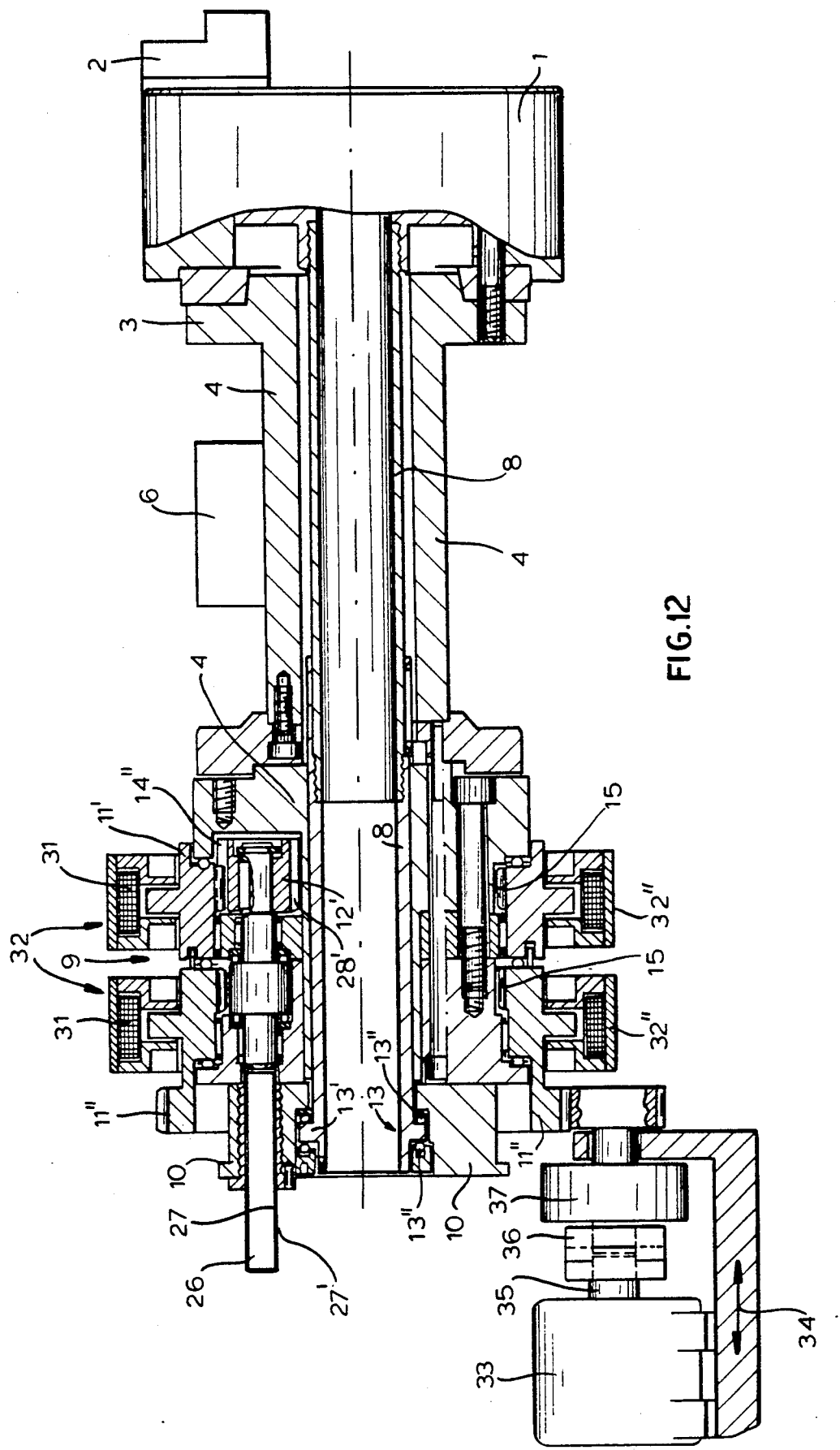
FIG. 12 is an axial section through a variant on the arrangement of FIG. 11.

In the arrangement of FIG. 11 the spindle 4 has an outer part 4' carrying the chuck head 3 and an inner part formed of elements 42 and 42' held together by bolts 42" and 42'" that carry the transmission 9 and the drive pulley 7. A clutch 57 is provided between the parts 4' and 4" and is comprised of a plate 61 secured by splines to the part 4' and engageable with teeth 62 of the pulley 7. Further teeth 63 can be engaged by a clutch actuator 65 movable axially as shown at 64 or by an electromagnetic actuator. A spring 66 normally urges the clutch to the closed condition, with the teeth 62 engaged and the parts 4' and 4" rotationally coupled. The actuator 65 can pull the teeth 62 apart and engage the teeth 63 together to rotationally arrest the part 4'. Such arresting of the part 4' allows the drive to be effective to open or close the clutch while it is stationary FIG. 12 shows an arrangement identical to that of FIG. 11 except that a motor 33 has a rotary output 35 connectable as shown by arrow 34 via a clutch 36 to a drive block 37 in turn carrying a gear meshing with teeth formed on the wheel 11". Thus this motor 33 can be clutched in to rotate the wheel 11" in either direction and thereby adjust the chuck when it is stationary, provided of course the spindle 4 and actuator 1 are arrested.

I claim:

1. A power-chuck assembly comprising:
   a stationary housing;
   a chuck spindle rotatable in the housing about a chuck axis;
   a plurality of jaws carried on the chuck body movable radially toward and away from one another;
   an actuator shaft movable axially relative to the body;
   jaw-actuator means connected between the actuator shaft and the jaws for displacing same radially outward on displacement of the shaft in one axial direction and for displacing the jaws radially inward on opposite axial displacement of the shaft;
   motion-converting means carried on the spindle and including
      a pair of coaxial input wheels centered on and rotatable about the axis on the spindle,
      gear means connected between the input wheels for synchronously oppositely rotating same,
      an output element axially displaceable on the spindle and axially coupled to the shaft, and
      gearing interconnecting the input wheels and output element for axial displacement of the output element in one direction on rotation of one of the input wheels in one rotational sense and for axial displacement of the output element in the opposite direction on rotation of the one input wheel in a rotational sense opposite to the one rotational sense; and
   means including respective brakes between the housing and the input wheels for rotationally retarding rotation of the respective wheels relative to the housing.

2. The chuck assembly defined in claim 1 further comprising
   bearing means interconnecting the output element and the shaft for joint axial movement but relative rotation.

3. The chuck assembly defined in claim 1 wherein the two input wheels have confronting toothed faces and the gear means includes a gear rotatable about an axis perpendicular to the chuck axis.

4. The chuck assembly defined in claim 3 wherein the spindle is provided with a radially projecting pivot centered on the axis of the gear and rotationally supporting the gear.

5. The chuck assembly defined in claim 1 wherein the gearing includes respective axially extending rods having ends threaded into the output element and ends carrying gears meshing with the respective input wheels, the gear means including respective sets of teeth on the rods meshing with each other.

6. The chuck assembly defined in claim 1 wherein the gearing includes at least one axially extending rod having an end threaded into the output element and an opposite end formed with a gear, one of the input wheels being formed with a ring of teeth meshing with the gear of the rod.

7. The chuck assembly defined in claim 6 wherein the rod is journaled in the other input wheel and has another gear, the spindle being formed with a ring of teeth meshing with the other gear.

8. The chuck assembly defined in claim 6 wherein the motion-converting means further includes
   a ring rotatable about the chuck axis in the spindle, the rod being journaled in the ring and having another gear, the other input wheel being formed with another ring of teeth meshing with the other gear of the rod, one of the rings of teeth being external and the other ring of teeth being internal.

9. The chuck assembly defined in claim 6 wherein the output element is provided with a bushing in which the rod is axially threaded, the output element being provided with a pair of stops permitting the bushing to rotate through less than one revolution in the output element on rotation of the rod.

10. The chuck assembly as defined in claim 1 wherein the means including respective brakes includes respective coils juxtaposed with the input wheels.

11. The chuck assembly defined in claim 10 wherein each coil is provided with a stator ring coaxially surrounding the respective wheel.

12. The chuck assembly defined in claim 11 wherein each wheel has a ferromagnetic rim juxtaposed with the respective coil.

13. The chuck assembly defined in claim 10, further comprising
control means connected to the coils for alternately energizing same to form therewith fields of variable strength.

14. The chuck assembly defined in claim 1, further comprising
brake means for rotationally relatively fixing the jaws, shaft, and jaw-actuator means relative to the spindle; and
control means connected to the brake means for, in a machining position rotationally fixing the jaws, shaft, and jaw-actuator means relative to the spindle while permitting the input wheel to rotate freely about the axis and, in an adjusting position, for fixing one of the input wheels against rotation relative to the housing and freeing the jaws, shaft, and jaw-actuator means to rotate relative to the spindle, whereby in the adjusting position rotation of the spindle will adjust the position of the jaws and in the machining position arresting of the input wheel will also adjust the position of the jaws.

15. The chuck assembly defined in claim 14 wherein the spindle has an outer end fixed to and carrying the jaw-actuator means and an inner end adapted to be connected to a drive means, the brake means including
a normally closed clutch between the inner and outer spindle ends rotationally linking same together when closed, and
an openable and closeable link means engageable between the housing and the outer spindle end and displaceable between a coupling position rotationally linking same, opening the clutch, and thereby rotationally arresting the outer spindle end and a decoupling position rotationally coupling the spindle ends.

16. The chuck defined in claim 15 wherein the link means includes
a link body axially displaceable in the housing, the outer spindle end being formed with an axially open recess in which the link body is engageable, and
a cylinder formed in the housing around the body and pressurizable to displace the body.

17. The chuck defined in claim 14 wherein the brake means includes an openable and closable link means engageable between the housing and the shaft and displaceable between a coupling position rotationally linking same and thereby rotationally arresting the shaft and a decoupling position permitting the shaft to rotate in the housing.

18. The chuck defined in claim 17 wherein the link means includes
a link body axially displaceable in the housing, the shaft being formed with an radially open recess in which the link body is engageable,
a spring braced between the link body and the housing and urging the body axially away from the recess, and
a cylinder formed in the housing around the body and pressurizable to displace the body away from the recess and compress the spring.

19. The chuck defined in claim 16 wherein the brake means includes an openable and closable link means engageable between the housing and one of the input wheels and displaceable between a coupling position rotationally linking same and thereby rotationally arresting the one input wheel and a decoupling position permitting the one input wheel to rotate in the housing.

* * * * *